United States Patent [19]

Lee

[11] Patent Number: 4,482,574

[45] Date of Patent: Nov. 13, 1984

[54] PROCESS FOR THE PREPARATION OF PROTEIN FOR HYDROLYSIS

[75] Inventor: Chang R. Lee, Yonkers, N.Y.

[73] Assignee: Stauffer Chemical Company, Westport, Conn.

[21] Appl. No.: 590,543

[22] Filed: Mar. 19, 1984

Related U.S. Application Data

[63] Continuation of Ser. No. 350,844, Feb. 22, 1982, abandoned.

[51] Int. Cl.$^3$ ............................................. A23J 3/00
[52] U.S. Cl. ....................................... 426/7; 426/32; 426/42; 426/44; 426/46; 426/56; 426/656; 426/657
[58] Field of Search ................... 426/7, 32, 42, 44, 46, 426/52, 56, 656, 657

[56] References Cited

U.S. PATENT DOCUMENTS

| | | | |
|---|---|---|---|
| 3,220,851 | 11/1965 | Rambaud | 426/46 |
| 3,560,219 | 2/1971 | Attebery | |
| 3,697,285 | 10/1972 | Faith, Jr. et al. | 426/32 X |
| 3,761,353 | 9/1973 | Noe et al. | |
| 3,814,816 | 6/1974 | Gunther | 426/52 X |
| 3,857,966 | 12/1974 | Feldman et al. | 426/46 X |
| 4,036,999 | 7/1977 | Grindstaff | |
| 4,100,024 | 7/1978 | Adler-Nissen | 426/46 X |
| 4,107,334 | 8/1978 | Jolly | 426/52 X |

FOREIGN PATENT DOCUMENTS 53-44661  4/1978  Japan.

OTHER PUBLICATIONS

Yamagishi, T., et al., "Effect of Sulphydryl and Disulphide Compounds on the Formation and Quality of Thermal Aggregates of Soya Bean 11S Globulin", J. Sci. Food Agric., 33, 1982, pp.-1092-1100.

Stadelman, W. J., et al., "Chemistry of Eggs and Egg Products", in: *Egg Science and Technology*, (Westport Conn., the Avi Publ. Co. Inc., 1973), p. 73.

Clegg, K. M., et al., "Dietary Enzymic Hydrolysates of Protein with Reduced Bitterness", J. Fd. Technol., 9, 1974, pp. 21-29.

Stansby, M. E., et al., "Chemical Composition of Commercially Important Fish of the United States", Reprint 47, Fishery Ind. Res., vol. 3, No. 4, Mar. 1967, pp. 29-46.

Watanabe, K., et al., "Heat-Induced Changes in Sulphydryl and Disulphide Levels of $\beta$-Lactoglobulin A and the Formation of Polymers", J. Dairy Res., (1976), 43, pp. 411-418.

Beveridge, T., et al., "Heat Induced Changes in Sulphydryl Levels in Egg White", J. Inst. Can. Sci. Technol. Aliment., vol. 12, No. 4, Oct. 1979, pp. 173-176.

Borgstrom, G. et al., "Fish Protein-Nutritive Aspects," in: *Fish as Food*, vol. 2, (Academic Press, N.Y., 1962), pp. 46 and 47.

Voutsinas, L. P., et al., "Relationships Between Protein Hydrophobicity and Thermal Functional Properties of Food Proteins", J. Inst. Can. Sci. Technol. Aliment., vol. 16, No. 3, 1983, pp. 185-190.

Cunnigham, F. E., et al., "Stabilization of Egg-White Proteins to Pasteurizing Temperatures Above 60° C.", Food Technology, Sep. 1965, pp. 136-141.

Lei, M. G. et al., "Effect of Cysteine on Heat Activation of Soybean Trypsin Inhibitors", J. Agric. Food Chem., vol. 29, No. 6, 1981, pp. 1196-1199.

Wall, J. S., "Disulfide Bonds: Determination, Location, and Influence on Molecular Properties of Proteins", J. Agric. Food Chem., vol. 19, No. 4, 1971, pp. 619-625.

*Primary Examiner*—Robert Yoncoskie
*Attorney, Agent, or Firm*—Paul J. Juettner

[57] ABSTRACT

An improved hydrolysate is prepared from a water-soluble protein by enzymolysis wherein the protein has been heated under alkaline conditions for a period of time insufficient to gel the protein followed by cooling the solution to below 30° C.

25 Claims, No Drawings

PROCESS FOR THE PREPARATION OF PROTEIN FOR HYDROLYSIS

This is a continuation, of application Ser. No. 350,844 filed Feb. 22, 1982 now abandoned.

BACKGROUND OF THE INVENTION

1. Field of the Invention

The invention relates to processes for enzymatically hydrolyzing proteinaceous solutions, particularly to provide organoleptically desirable protein hydrolysate compositions which can be used for dietary purposes and in particular for hospital diets.

2. The Prior Art

It is well known that proteins can be digested with strong acid or alkali or with enzymes and used in diet foods. Hydrolysis of the protein takes place with the subsequent formation of protein fragments, peptides and amino acids. Fragmented protein materials of this type are desirable products for administration to humans and animals with digestive problems. However, the primary problem relative to the adoption of these techniques is the palatability of the product.

Of the known means to hydrolyze protein, enzymatic hydrolysis is preferred since it does not destroy essential amino acids to the extent that they are destroyed by acid or alkaline hydrolysis. However, enzymatic hydrolysis rarely goes to completion and the products of the enzymatic hydrolysis cannot be predicted and frequently the hydrolyzed protein is unsuitable because it contains bitter-tasting peptides. Products of this type to be effective as diets must be organoleptically acceptable. (Dietary Enzymatic Hydrolysates of Protein with Reduced Bitterness, Clegg et al., J. Food Tech. (1974) 9, 21–29).

In U.S. Pat. No. 3,857,966 there is disclosed a method for preparing an egg albumen hydrolysate which does not contain the characteristic egg smell and taste. Egg albumen in a 5% solution (pH 6.3–6.4) is heated to precipitate the protein. After cooling, the precipitate is separated by centrifugation, homogenized in a Waring blender and centrifuged again. The washing step is repeated once more and the washed precipitate is used to make a 5% protein suspension for hydrolysis.

After heating (95°–100° C.) the protein suspension at an alkaline pH (pH 8–9) for about 1 hour, enzymatic hydrolysis is then conducted using a two-stage enzyme system of an alkaline microbial protease in the first stage and a blend of neutral microbial protease and a plant enzyme in the second stage. Similar techniques are indicated in the patent to be applicable to soy protein isolate, whey or whey protein and fish protein.

The pretreatment is a necessary part of the egg albumen hydrolysis procedure since very little hydrolysis can be obtained in a short period of time without it.

U.S. Pat. No. 4,107,334 uses a similar precipitation technique to prepare the functional protein from microbial, or vegetable protein, or whey by hydrolysis. Generally a solution of low solids and protein content is preferably adjusted to a pH of about the isoelectric point of the protein (4–7) and heated until a large proportion of the protein (at least 50%) has been precipitated (for whey protein concentrate—90° C. for 2 minutes).

After washing the protein is hydrolyzed using any acid, neutral or alkaline protease (fungal protease suggested).

The value of a protein hydrolysate in a special diet program depends in large part on the degree of hydrolysis. For instance, for the use of a hydrolysate for patients with digestion problems, at least 80% of the hydrolysate should be in the form of peptides of 500 molecular weight or less and 95% of the hydrolysate should be in the form of peptides of less than 2000 molecular weight. Such an extensive hydrolysis may have the disadvantages of long uneconomical reaction times, organoleptic problems, and biological contamination problems.

Untreated egg albumen only hydrolyzes to a limited extent over a long period of time. Extensive precipitation and purification pretreatment steps are necessary to effectively hydrolyze egg albumen.

THE INVENTION

It has now been found that an improved hydrolysate as well as an improved hydrolysis rate can be obtained without extensive precipitation and separation techniques by heating a solution of a water-soluble protein at an alkaline pH to a temperature within the range of from about 50° C. and 150° C. at a temperature and for a time insufficient to gel the solution, cooling the solution to a temperature below 30° C. and about 2° C. within at least about 60 minutes after reaching the elevated temperature at a rate sufficient to prevent any further substantial change in the protein structure, and enzymatically hydrolyzing the protein in the so treated solution.

Preferably, the alkaline pH is readjusted to below pH 7.5 and above pH 6 and preferably within the range of from 6.5 to about 7.5 prior to hydrolysis. Cooling is generally initiated within 1 hour and preferably within 30 minutes after the temperature of the solution has reached its maximum level. Cooling is conducted at a rate sufficient to prevent any further substantial change in the protein and to avoid gelation of the protein containing solution.

It has also been found that by the use of fungal protease and pancreatin good yields in short reaction times with limited organoleptic problems can be obtained.

DETAILED DESCRIPTION OF THE INVENTION

The process of the present invention can be successfully employed to hydrolyze proteins from any source provided that at least 50% by weight of the protein is soluble in water at alkaline pH, i.e. from about pH 7 to about pH 10. Animal proteins include egg albumen, whey protein, water-soluble fish protein, and the like. The whey protein can be derived from any cheese source and is preferably concentrated though dried whey can also be used. Microbial protein may be derived from yeast (e.g. genera Saccharomyces, Candide, Hansenula, and Pichia), bacteria (e.g. genera Pseudomonas, Lactobacillus, Streptococcus, Micrococcus, Cellulomonas, Arthrobacter, Bacillus, Hydrogenomonas, and Aerobacter) and fungi (e.g. genera Trichoderma, Fusarium, Penicillium, Aspergillus, Neurospora, and Endomycopsis). The microbial cells are initially ruptured and the cell protein content separated from the cell debris by conventional techniques prior to processing.

Suitable vegetable protein sources include, for example, soybeans, wheat gluten, cottonseeds, okra, corn gluten, peanuts, potatoes, alfalfa, oats, rice, rapeseeds, sesame seeds and sunflower seeds. Preferred sources are soybeans, wheat gluten and cottonseeds. Especially preferred are soybeans in such forms as soy grits, solvent-extracted soybean flakes, soy flour, alcohol-treated soy flakes, soy concentrate, soy isolate and soy whey. The protein source is usually slurried in water, any undissolved material is separated, and the liquid phase is introduced into the process. Vegetable protein whey, like cheese whey, may be processed directly.

The dairy whey proteins can be provided by raw or concentrated whey or by whey proteins containing products such as clarified dairy whey (clarified by the processes of U.S. Pat. No. 3,560,219 or U.S. Pat. No. 4,036,999), demineralized whey, delactosed whey, delactosed demineralized whey, and the like. Preferably, the whey protein is used in the form of a whey protein concentrate (WPC) containing at least 30% and preferably from about 40% to 60% protein. Whey protein concentrates containing 100% and preferably about 90% protein can also be used but these are impractical from a commercial standpoint.

The whey protein concentrates can be prepared by any one of a number of known processes including electrodialysis (Stribley, R. C., Food Processing, Volume 24, No. 1, page 49, 1963), reverse osmosis, (Marshall, P. G. et al., Fractionation and Concentration of Whey by Reverse Osmosis, Food Technology, 22 (a), 696, 1968); gel filtration (U.S. Reissue Patent No. 27,806); ion exchange (Palmer, D. E., Volume 12 (No. 5) June 1977, pages 24-28); or by ultrafiltration (Horton, B. S. et al., Food Technology, Volume 26, page 30, 1972). Chemical methods including the phosphate precipitation of whey protein can also be used as described in Gordon U.S. Pat. No. 2,388,624 and Melachouris U.S. Pat. No. 4,043,990. The disclosures of the foregoing articles and patents are incorporated herein by reference. The whey protein concentrate preferably contains from about 40% to about 60% protein based on total Kjeldahl nitrogen. Preferred among these are whey products containing at least 40% protein, egg albumen in either liquid, fresh or powdered form, whey protein and soy protein concentrates as well as undenatured fish protein.

The protein source can be selected from those which are available commercially or they can be prepared according to techniques well known to the art. Such commercially available protein include SUPRO soy isolate, whey protein concentrate (40-90% protein), egg albumen, and fish protein (e.g. Atra-Nabisco EFP-90 eviscerated fish protein).

Since the hydrolysate used in hospital diets should be as low in lactose and ash as possible to avoid digestion problems, it is preferred to utilize as the protein source for hydrolysis a material which is high in protein and low in lactose. For these reasons, egg albumen is a preferred protein source.

The protein containing solution to be treated does not require a minimum amount of protein for effective treatment. Thus, a protein concentration ranging from about 1% to about 20% can be treated. It is preferred not to use a protein solution having more than 15% protein in solution since the conditions of the reaction tend to gel solutions with protein content greater than 15% before completion of the treatment.

Subsequently, the pH is adjusted to an alkaline range of from about pH 7.0 to about pH 10, preferably from pH 8 and more preferably for whey proteins (dairy) and egg albumen from about pH 9 to about pH 10. Any food grade alkalizing agent which does not interfere with the final reaction product and/or its use can be used such as potassium hydroxide and preferably sodium hydroxide. Calcium hydroxide, while being an effective alkalizing agent, is less preferred since calcium can cause protein crosslinking and, therefore, insolubilization. Other methods of elevating the pH can be used such as passing the protein system through an anionic/cationic exchange resin.

The alkalizing agent is added under conditions which will not cause localized pH elevations above about pH 10 to thereby avoid extensive protein denaturation.

The alkaline whey protein solution is then heated to a temperature within the range from about 50° C. up to the gelation temperature of the protein for a time insufficient to cause gelation. The heating temperature preferably ranges from about 50° C. to about 150° C., more preferably 50° C. to about 95° C., and most preferably from about 50° C. to about 80° C. The temperature should be elevated as fast as possible without causing protein insolubilization by gelation since long time heating causes the formation of disulfide linkages between protein molecules. The maximum heating time is the gelation point of the protein. The heating time should not be over a maximum of 1 hour and preferably less than 30 minutes and more preferably less than 15 minutes. The heating is conducted at a rate such that the solution is not gelled. The alkali can be added to a heated solution or the alkalization and heating can be conducted simultaneously, particularly using a heating unit that will elevate the temperature rapidly.

After the alkalized whey protein solution has reached the maximum temperature level, cooling is preferably immediately applied to reduce the temperature of the solution below that at which further change in the protein structure occurs and preferably to room temperature. Adequate agitation is necessary to insure that cooling is uniform throughout the mass. The cooling rate and temperature are relative to the heating rate and temperature as well as the activation point of the protein so that the cooling retards further unfolding of the protein. Therefore, cooling must be initiated within 1 hour after the completion of the heating step and preferably in less than 15 minutes depending on the activation point of the protein and the temperature used. In order to prevent gelation of the protein, the heat must be lowered rapidly to below at least about 60° C. within less than about 1 minute to prevent further change in the protein structure or initiate protein to protein interaction. Under these conditions, high temperature short time pasteurization can effectively be used to heat the alkaline whey protein containing solution to a temperature within the range of from about 70° C. to about 75° C. and cool within a minute, preferably $\frac{1}{2}$ minute.

Subsequent to cooling, the pH is preferably adjusted to a range of about 6 to about 7.5 and preferably from about 6.5 to about 7.0 with any food grade acid with agitation. Since the cooling step is conducted with rapid stirring, it is possible to adjust the pH during the cooling step. The pH utilized can be that most effective for the enzymes used in the hydrolysis.

The foregoing procedure is more fully set out in the copending application Ser. No. 187,352 filed Sept. 24, 1980 entitled A PROTEIN COMPOSITION CHARACTERIZED BY LOWER THERMOGELATION TEMPERATURE AND IMPROVED ACID SOLUBILITY by C. R. Lee and, P. Chang and Ser. No. 290,265 filed Aug. 3, 1981, now U.S. Pat. No. 4,414,240, entitled A PROCESS FOR LOWERING THE THERMOGELATION TEMPERATURE OF EGG ALBUMEN by C. R. Lee, the disclosures of which are incorporated herein by reference.

As an optional step, the solution can be subjected to pasteurization conditions well known to a skilled artisan. The product can also be heated to destroy any enzyme inhibitors, generally from about 65° C. to about 90° C. for a minimum of about 1 minute though this has not been found to be essential for high yields.

The material obtained at this point with or without the pasteurization can then be dried or subjected to hydrolysis using standard known techniques such as outlined in U.S. Pat. Nos. 3,857,966 and 4,107,334.

The pretreated protein is dispersed, generally in an aqueous medium, for hydrolysis. The concentration of protein in the dispersion is not critical and normally ranges from about 1% to about 20% and preferably from about 3% to about 9% based on the total weight of the dispersion. Any hydrolysis means can be used including chemical such as acid, alkali or enzymatic, the enzymatic being preferred. Any acid, neutral or alkaline protease, any animal or plant protease or combinations thereof can be used for hydrolysis. Any blends of enzymes can be used if desired.

The minimum level of proteolytic activity is related to the practical rate of the hydrolysis, the maximum level is determined solely by economics. A crude enzyme may require too great an amount to provide a practical hydrolysis rate whereas a highly purified enzyme can be too expensive for practical use. A practical operating range for the proteolytic enzyme level can be easily determined by a skilled artisan.

The temperature and the pH of the hydrolysis will depend upon the nature of the protein hydrolyzed and the proteolytic enzyme employed, and are selected to optimize the conversion of the denatured protein to hydrolysates. Convenient temperatures range from about 20° to 65° C. Below 20° C., the hydrolysis proceeds at a rather slow rate, while at temperatures above 65° C. the enzyme may be inactivated. The optimum temperature normally ranges from about 40° C. to about 55° C.

At the completion of the hydrolysis reaction, the resulting protein solution is treated to inactivate the enzyme. The method of treatment will depend upon the nature of the enzyme, but the inactivation is usually accomplished by heating the reaction solution to from about 75° to 100° C. for from about 1 to 60 minutes. Depending on the enzyme employed, such treatment may be accompanied by a pH adjustment (pH 6-8 being preferred).

It has also been found that the use of a combination of fungal protease and pancreatin as disclosed in copending application Ser. No. 350,800 filed Feb. 22, 1982 entitled PROCESS FOR THE PREPARATION OF PROTEIN HYDROLYSATES in the names of N. Melachouris, C. Lee and C. F. Lin provides a fast and efficient enzyme system for hydrolyzing a preteinaceous material prepared by the aforementioned pretreatment process. The hydrolysis reaction can be completed in a shorter time at a higher degree of digestion thereby avoiding flavor and microbiological contamination problems. The product, especially after a post-clarification treatment, is a clear solution high in short chain peptides, low in ash and having good organoleptic properties.

A fungal protease can be derived from the genus Aspergillus illustrated by *A. oryzae, A. flavus, A. niger,* and particularly *A. oryzae.* Known enzyme preparations from *A. oryzae* are mixtures of acid neutral and alkaline proteases demonstrating both exopeptidase and endopeptidase activity on protein molecules. The activity of fungal protease is generally within the range of from about 1,000 to about 100,000 and preferably from about 8,000 to about 20,000 hemoglobin units per gram of protein in the starting material. One hemoglobin unit is that amount of enzyme which will liberate 0.0447 mg. of non-protein nitrogen in 30 minutes. The optimum temperature for effective use of the fungal protease from *A. oryzae* ranges from about 40° C. to about 60° C. and preferably from about 45° C. to about 55° C.

The pancreatin is a pancreas extract which can be obtained from porcine, ovine or bovine. The proteolytic enzymes in the pancreatin are principally trypsin, chymotrypsin (A, B and C), elastase, and carboxypeptidase (A and B). The pancreatin is processed such that substantially all (at least 70%) of the exo- and endopeptidases originally extracted from the pancreas source remains in the pancreatin. The protease activity for the pancreatin can range from about 1,000 to about 100,000 and preferably from about 8,000 to about 20,000 N.F. units per gram of protein in the starting material. One N.F. unit of protease activity is contained in that amount of pancreatin that digest 1 milligram of casein under the conditions of the N.F. Assay for the activity of the enzyme. The optimum pH range for use depends on the enzyme activity desired The optimum pH range for trypsin ranges from about 7 to about 9. Optimum temperature range for use is up to 50° C. (preferably about 40° C. to about 50° C.).

The units used to express the activity of proteases are well known to the art and are clearly defined in such references as the First Supplement to the Food Chemical Codex, Second Edition, 1974.

The fungal protease is used in a ratio to the pancreatin within the range of about 1:1 to about 1:5 and preferably from about 1:3 to about 1:4. This is the ratio of the total amount of fungal protease to pancreatin used in the hydrolysis. The hydrolysis can be conducted using a one or two stage introduction of the enzymes. The proteinaceous material can be partially hydrolyzed with fungal protease and, after heat inactivation, further hydrolyzed with pancreatin alone or preferably with a combination of fungal protease and pancreatin. In this case the ratio of fungal protease to pancreatin added in the second stage ranges from about 1:1 to about 1:5, the total ratio of fungal protease to pancreatin being as given hereinbefore. The proteinaceous material can also be hydrolyzed using only the combination of fungal protease and pancreatin. To avoid one enzyme from hydrolyzing the other, the enzymes are usually added separately allowing about 1 minute for the first enzyme (fungal protease) to establish itself before addition of the second (pancreatin).

In the two step hydrolysis, the first stage is allowed to proceed for at least 5 hours and preferably from about 6 to about 8 hours though longer times can be used if desired. The second stage is allowed to proceed for a period of time sufficient to provide the degree of hydrolysis desired, usually from about 12 to about 17 hours. In the single stage hydrolysis, the reaction can be allowed to proceed for at least 6 hours and preferably from about 6 to about 8 hours. The degree of hydrolysis is related to the period of incubation, the shorter the incubation time the lower the degree of hydrolysis.

At the conclusion of the first stage or the second stage, the enzymes are inactivated by known procedures usually by heating, i.e. 90° C. for 5–10 minutes or 75° C. for 30–60 minutes and variations thereof. A combination of pH and temperature adjustments may be used for inactivation when the use of high temperatures is undesirable. The product can also be pasteurized at this point in the process. After cooling, the product can be dried, used as is or further processed to improve clarity such as by centrifugation and/or filtering.

It has also been found desirable to incorporate an adsorbent such as activated carbon or bentonite in an amount ranging from about 25% to about 200% based on the weight of the protein used to prepare the hydrolysates in the liquid to improve flavor and color. After separation of the adsorbent (filtration and/or centrifugation), the hydrolysate can be dried by any suitable means such as freeze drying or spray drying.

The hydrolysates, either before separation or after separation and/or drying, can be employed in a wide variety of food substrates to increase the nutritional value thereof. For example the hydrolysates can be used in dry beverage mixes, soft drinks, fruit juices, flavored liquid beverages and the like with no adverse effect on the organoleptic characteristics of the beverages. The most direct use of the hydrolysate is in a liquid special diet. This generally takes the form of a flavored emulsion with characteristics of a milk shake. Frozen slushes can also be prepared containing the hydrolysate.

As used herein all percentages are by weight based on the weight of the composition referred to unless otherwise stated.

Protein amounts are determined by the Kjeldahl method.

The invention will be further illustrated in the Example which follows.

EXAMPLE 1

A commercially obtained dried egg albumen was dissolved in an aqueous solution to provide approximately 10% (W/V) total solids in solution at room temperature. The pH of the solution was about 7. The pH was adjusted to about pH 9.5 by the slow addition of sodium hydroxide with rapid stirring. The alkaline egg albumen solution was heated to 60° C. and immediately rapidly cooled to below about 50° C. After reaching room temperature, the pH of the solution was adjusted to about 7 by the slow addition of hydrochloric acid. To this solution was added 0.25% (W/V) commercial fungal protease having an activity of 384,000 hemoglobin units per gram enzyme. This is equivalent to an activity of 11,707 hemoglobin units per gram protein in substrate. The solution was incubated for 6 hours at 50° C. with stirring. The pH was then adjusted to pH 9.5 by the slow addition of sodium hydroxide with stirring. After heating to about 75°–80° C., the solution was immediately cooled and the pH adjusted to pH 8. 0.25% (W/V) of commercial pancreatin containing 100 N.F. units per milligram was added and the solution was incubated for 17 hours at 45° C. The enzymes were inactivated by heating to 85°–100° C. for a sufficient time to effect inactivation and pasteurization. The solution was centrifuged at 650 gravities for 1 hour and filtered. The supernatant was freeze dried. The yield which was calculated after heating to 85° C., centrifuging and filtering was 77% after only 23 hours of incubation. The percent soluble nitrogen in 15% trichloroacetic acid was 69% of the starting egg albumen nitrogen.

The foregoing procedure was compared to a like process without the first two heating steps (the heating before and after the first incubation step). The egg albumen hydrolysis was incomplete even after 48 hours and looked like a paste when heated to 85° C. The coagulated hydrolysate could not be filtered and showed poor separation upon centrifugation.

What is claimed is:

1. A process for enzymatically hydrolyzing a proteinaceous material comprising:
   (a) adjusting the pH of an aqueous solution of a proteinaceous material in which at least 50% of the protein is soluble in water at an alkaline pH ranging from about 7 to about 10 to a pH within the range of from about 7.5 to about 10 and at least 0.5 pH units above the native pH of the solution of proteinaceous material, said solution having a temperature of less than about 30° C., the total dissolved protein content ranging from about 0.5% and about 20% by wieght when determined at said pH;
   (b) heating the alkaline solution of step (a) to an elevated temperature within the range of from about 50° C. and about 150° C. at a rate insufficient to cause gelation of the solution;
   (c) cooling said heated solution to a temperature within the range of from about 30° C. to about 2° C. within 1 hour after the said solution reaches its maximum temperature level, said cooling being conducted at a rate sufficient to prevent gelation of said protein containing solution; and
   (d) enzymatically hydrolyzing the protein in the so treated solution to convert the protein to a hydrolyzate.

2. The process of claim 1 wherein said pH of step (a) ranges from about 8 to about 10.

3. The process of claim 2 wherein the pH of the solution is reduced to a pH within the range of from about 6 to about 7.5 simultaneously with or subsequent to cooling.

4. The process of claim 3 wherein the pH of the solution is reduced to a pH within the range of from about 6.5 to about 7.5.

5. The process of claim 1 wherein said solution contains from about 1% to about 20% protein.

6. The process of claim 1 wherein the temperature of step (b) ranges from about 50° C. to about 80° C.

7. The process as recited in claim 1 wherein the protein, is enzymatically hydrolyzed with fungal protease or pancreatin.

8. The process as recited in claim 7 wherein the protein is first reacted with fungal protease followed by reacting the protein with fungal protease in combination with pancreatin.

9. The process as recited in claim 7 wherein the protein is hydrolyzed with fungal protease in combination with pancreatin.

10. The process as recited in claim 7 wherein the ratio of fungal protease to pancreatin ranges from about 1:1 to about 1:5.

11. The process as recited in claim 1 wherein the product of hydrolysis is treated with a adsorbent to purify the product.

12. The process as recited in claim 11 wherein the product of hydrolysis is treated with activated carbon.

13. The process as recited in claim 7 wherein the fungal protease has an activity of from about 1,000 to about 100,000 hemoglobin units per gram protein.

14. The process as recited in claim 7 wherein the pancreatin has an activity of from about 1,000 to about 100,000 N.F. units per gram of protein.

15. The process as recited in claim 13 wherein the fungal protease has an activity of from about 8,000 to about 20,000 hemoglobin units per gram protein.

16. The process as recited in claim 14 wherein the pancreatin has an activity of from about 8,000 to about 20,000 N.F. units per gram of protein.

17. The process as recited in claim 1 wherein said proteinaceous material is vegetable protein.

18. The process as recited in claim 17 wherein said vegetable protein is soy.

19. The process as recited in claim 1 wherein said proteinaceous material is animal protein.

20. The process as recited in claim 19 wherein said protein is egg albumen.

21. The process as recited in claim 19 wherein said protein is a dairy protein.

22. The process as recited in claim 19 wherein said protein is fish protein.

23. The process as recited in claim 1 wherein said protein is microbial protein.

24. A process for enzymatically hydrolyzing egg albumen which comprises:
(a) adjusting the pH of an aqueous solution of egg albumen to a pH within the range of from about 7 to about 9.5 and at least 0.5 pH units above the natural pH of the egg albumen in solution, the dissolved protein content ranging from about 0.5% to about 20% by weight when determined at that pH;
(b) heating the alkaline solution to an elevated temperature within the range of from about 50° C. to about 80° C. at a rate insufficient to cause gelation of the solution;
(c) cooling the heated solution to a temperature within the range of from about 30° C. to about 2° C. within 15 minutes after the solution reaches maximum temperature, the cooling being conducted at a rate sufficient to prevent gelation;
(d) adjusting the pH to a pH within the range of from about 6 to about 7.5;
(e) adding fungal protease at an activity of from about 1,000 to about 100,000 hemoglobin units per gram of protein.
(f) incubating the solution for a period ranging from about 5 to about 10 hours at a temperature ranging from about 45° to about 55° C.;
(g) adjusting the pH as in step (a); h) heating the alkaline solution to a temperature within the range of from about 75° to about 80° C.;
(i) cooling as in step (c);
(j) adjusting the pH to a pH within the range of about 7.5 to about 8.5;
(k) adding pancreatin at an activity ranging from about 1,000 to about 100,000 N.F. units per gram protein;
(l) incubating for a period of time ranging from about 10 to about 17 hours at a temperature ranging from about 40° to about 50° C. at a pH ranging from about 7.5 to about 8.5; and
(m) heating to inactivate the enzyme followed by separating the product.

25. The product of claims 1, 7, 20 or 24.

* * * * *

UNITED STATES PATENT AND TRADEMARK OFFICE
CERTIFICATE OF CORRECTION

PATENT NO. : 4,482,574
DATED : November 13, 1984
INVENTOR(S) : Chang R. Lee

It is certified that error appears in the above—identified patent and that said Letters Patent is hereby corrected as shown below:

Col. 2, line 55, "Candide" should be -- Candida --;
Col. 3, line 9, "proteihs" should be -- proteins --;
Col. 3, line 39, "cohtaining" should be -- containing --;
Col. 6, line 2, "acid" should be -- acid, --;
Col. 8, line 20, "wieght" should be -- weight --;
Col. 8, line 49, "tein," should be -- tein --;
Col. 10, line 18, "h)" should start a new line.

Signed and Sealed this

Fourteenth Day of May 1985

[SEAL]

Attest:

DONALD J. QUIGG

Attesting Officer       Acting Commissioner of Patents and Trademarks